(12) United States Patent
Beckley et al.

(10) Patent No.: US 11,290,531 B2
(45) Date of Patent: Mar. 29, 2022

(54) IMMEDIATE CLOUD CONTENT ITEM CREATION FROM LOCAL FILE SYSTEM INTERFACE

(71) Applicant: Dropbox, inc., San Francisco, CA (US)

(72) Inventors: Cassandra Beckley, San Francisco, CA (US); Joshua Kaplan, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 16/702,648

(22) Filed: Dec. 4, 2019

(65) Prior Publication Data

US 2021/0176312 A1   Jun. 10, 2021

(51) Int. Cl.
| | |
|---|---|
| H04L 29/08 | (2006.01) |
| H04L 67/1095 | (2022.01) |
| H04L 67/1097 | (2022.01) |
| H04L 67/01 | (2022.01) |

(52) U.S. Cl.
CPC ...... *H04L 67/1095* (2013.01); *H04L 67/1097* (2013.01); *H04L 67/42* (2013.01)

(58) Field of Classification Search
CPC .. H04L 67/1095; H04L 67/1097; H04L 67/42
See application file for complete search history.

(56) References Cited

U.S. PATENT DOCUMENTS

| | | |
|---|---|---|
| 5,581,765 A | 12/1996 | Munroe et al. |
| 5,893,116 A | 4/1999 | Simmonds et al. |
| 5,907,848 A | 5/1999 | Zaiken et al. |
| 5,926,821 A | 7/1999 | Hirose et al. |
| 6,061,743 A | 5/2000 | Thatcher et al. |
| 6,065,018 A | 5/2000 | Beier et al. |
| 6,108,703 A | 8/2000 | Leighton et al. |

(Continued)

FOREIGN PATENT DOCUMENTS

| | | |
|---|---|---|
| EP | 1517260 A2 | 3/2005 |
| FR | 2924244 A1 | 5/2009 |

(Continued)

OTHER PUBLICATIONS

Ganzha M., et al., "Identifier Management in Semantic Interoperability Solutions for IoT," IEEE International Conference on Communications Workshops, Jul. 12, 2018, downloaded from the Internet: https://www.researchgate.net/publication/326218197_Identifier_Management_in_Semantic_Interoperabilit . . . , 7 pages.

(Continued)

*Primary Examiner* — Blake J Rubin
(74) *Attorney, Agent, or Firm* — Polsinelli PC

(57) ABSTRACT

The present technology addresses a scenario when a user attempts to create a cloud content item using a file system interface on a client device. The present technology can immediately create a content item that is representative of a cloud content item once the user requests a cloud content item to be created. The content item that is representative of the cloud content item can be created even before the cloud content item itself is created. After the cloud content item is created, the present technology provides a mechanism to relate the content item that this representative of the cloud content item with the actual cloud content item.

23 Claims, 8 Drawing Sheets

(56) References Cited

U.S. PATENT DOCUMENTS

| | | | |
|---|---|---|---|
| 6,336,173 B1 | 1/2002 | Day, III et al. |
| 6,470,329 B1 | 10/2002 | Livschitz et al. |
| 6,473,426 B1 | 10/2002 | Killian et al. |
| 6,560,591 B1 | 5/2003 | Memmott et al. |
| 6,728,723 B1 | 4/2004 | Kathail et al. |
| 6,834,284 B2 | 12/2004 | Acker et al. |
| 6,915,315 B2 | 7/2005 | Autrey et al. |
| 7,035,847 B2 | 4/2006 | Brown et al. |
| 7,117,303 B1 | 10/2006 | Zayas et al. |
| 7,308,545 B1 | 12/2007 | Kekre et al. |
| 7,318,134 B1 | 1/2008 | Oliveira et al. |
| 7,340,723 B2 | 3/2008 | Antonov et al. |
| 7,401,089 B2 | 7/2008 | Benton et al. |
| 7,437,405 B1 | 10/2008 | Theis et al. |
| 7,512,638 B2 | 3/2009 | Jhaveri et al. |
| 7,558,926 B1 | 7/2009 | Oliveira et al. |
| 7,599,941 B2 | 10/2009 | Bahar et al. |
| 7,685,171 B1 | 3/2010 | Beaverson et al. |
| 7,689,510 B2 | 3/2010 | Lamkin et al. |
| 7,716,180 B2 | 5/2010 | Vermeulen et al. |
| 7,814,499 B2 | 10/2010 | Straube et al. |
| 7,865,571 B2 | 1/2011 | Ho et al. |
| 7,869,425 B2 | 1/2011 | Elliott et al. |
| 7,870,355 B2 | 1/2011 | Erofeev et al. |
| 7,890,646 B2 | 2/2011 | Khosravy et al. |
| 7,925,966 B2 | 4/2011 | Kaler et al. |
| 7,937,686 B2 | 5/2011 | Sorensen et al. |
| 7,953,785 B2 | 5/2011 | Li et al. |
| 8,015,491 B2 | 9/2011 | Shaver et al. |
| 8,019,900 B1 | 9/2011 | Sekar et al. |
| 8,082,231 B1 | 12/2011 | McDaniel et al. |
| 8,112,505 B1 | 2/2012 | Ben-Shaul et al. |
| 8,140,473 B2 | 3/2012 | Sun et al. |
| 8,185,601 B2 | 5/2012 | Rauhala et al. |
| 8,214,747 B1 | 7/2012 | Yankovich et al. |
| 8,301,597 B1 | 10/2012 | Zhou et al. |
| 8,307,028 B2 | 11/2012 | Kakivaya et al. |
| 8,312,046 B1 | 11/2012 | Eisler et al. |
| 8,341,532 B2 | 12/2012 | Ryan et al. |
| 8,429,540 B1 | 4/2013 | Yankovich et al. |
| 8,458,299 B2 | 6/2013 | Lin et al. |
| 8,484,260 B2 | 7/2013 | Caso et al. |
| 8,503,984 B2 | 8/2013 | Winbush, III et al. |
| 8,527,549 B2 | 9/2013 | Cidon |
| 8,650,159 B1 | 2/2014 | Zhang et al. |
| 8,656,218 B2 | 2/2014 | Erofeev et al. |
| 8,661,428 B2 | 2/2014 | Clark et al. |
| 8,713,106 B2 | 4/2014 | Spataro et al. |
| 8,745,755 B2 * | 6/2014 | Borzycki | H04L 67/34 726/27 |
| 8,775,374 B2 | 7/2014 | Araki et al. |
| 8,805,793 B2 | 8/2014 | Patiejunas et al. |
| 8,819,587 B1 | 8/2014 | Shrum et al. |
| 8,825,597 B1 | 9/2014 | Houston et al. |
| 8,874,799 B1 | 10/2014 | Derbeko et al. |
| 8,880,538 B1 | 11/2014 | Petersson et al. |
| 8,892,679 B1 | 11/2014 | Destagnol et al. |
| 8,930,412 B2 | 1/2015 | Nelson et al. |
| 8,949,179 B2 * | 2/2015 | Besen | G06F 16/1794 707/610 |
| 8,949,208 B1 | 2/2015 | Xu et al. |
| 8,959,067 B1 | 2/2015 | Patiejunas et al. |
| 8,959,607 B2 | 2/2015 | Yadav et al. |
| 9,037,556 B2 | 5/2015 | Castellano et al. |
| 9,037,797 B2 | 5/2015 | McGroddy-Goetz et al. |
| 9,043,567 B1 | 5/2015 | Modukuri et al. |
| 9,183,303 B1 | 11/2015 | Goel et al. |
| 9,185,164 B1 | 11/2015 | Newhouse |
| 9,213,709 B2 | 12/2015 | Patiejunas et al. |
| 9,251,114 B1 * | 2/2016 | Ancin | G06F 16/178 |
| 9,253,166 B2 | 2/2016 | Gauda et al. |
| 9,282,169 B1 | 3/2016 | Chang |
| 9,286,102 B1 | 3/2016 | Harel et al. |
| 9,294,558 B1 | 3/2016 | Vincent et al. |
| 9,361,349 B1 | 6/2016 | Newhouse |
| 9,384,226 B1 | 7/2016 | Goel et al. |
| 9,479,548 B2 | 10/2016 | Jensen et al. |
| 9,479,567 B1 | 10/2016 | Koorapati et al. |
| 9,479,578 B1 | 10/2016 | Swanson |
| 9,563,681 B1 | 2/2017 | Patiejunas et al. |
| 9,652,741 B2 | 5/2017 | Goldberg et al. |
| 9,697,269 B2 | 7/2017 | Koorapati et al. |
| 9,727,470 B1 | 8/2017 | Cande et al. |
| 9,773,051 B2 | 9/2017 | Smith |
| 9,817,878 B2 | 11/2017 | Newhouse |
| 9,819,740 B2 | 11/2017 | Tataroiu et al. |
| 9,852,147 B2 | 12/2017 | Von Muhlen et al. |
| 9,852,149 B1 * | 12/2017 | Taylor | G06F 11/2089 |
| 9,852,150 B2 | 12/2017 | Sharpe et al. |
| 9,961,149 B2 | 5/2018 | Poletto et al. |
| 10,116,732 B1 | 10/2018 | Canton et al. |
| 10,146,873 B2 * | 12/2018 | Mullins | G06F 16/93 |
| 10,198,452 B2 | 2/2019 | Habouzit et al. |
| 10,229,134 B2 * | 3/2019 | Chiu | G06F 16/113 |
| 10,324,903 B1 | 6/2019 | Goldberg et al. |
| 10,503,822 B1 * | 12/2019 | Spencer | G06F 40/197 |
| 10,599,673 B2 * | 3/2020 | Goldberg | G06F 16/185 |
| 10,866,931 B2 * | 12/2020 | Lee | G06F 16/178 |
| 10,958,732 B1 * | 3/2021 | Procopio | H04L 67/02 |
| 2002/0048174 A1 | 4/2002 | Pederson |
| 2002/0078174 A1 | 6/2002 | Sim et al. |
| 2002/0112058 A1 | 8/2002 | Weisman et al. |
| 2002/0120763 A1 | 8/2002 | Miloushev et al. |
| 2002/0174180 A1 | 11/2002 | Brown et al. |
| 2003/0018878 A1 | 1/2003 | Dorward et al. |
| 2004/0024786 A1 | 2/2004 | Anderson et al. |
| 2004/0034712 A1 | 2/2004 | Rajwan et al. |
| 2004/0064488 A1 | 4/2004 | Sinha et al. |
| 2004/0068523 A1 | 4/2004 | Keith et al. |
| 2004/0133573 A1 | 7/2004 | Miloushev et al. |
| 2004/0133606 A1 | 7/2004 | Miloushev et al. |
| 2004/0133607 A1 | 7/2004 | Miloushev et al. |
| 2004/0133652 A1 | 7/2004 | Miloushev et al. |
| 2004/0162900 A1 | 8/2004 | Bucher et al. |
| 2005/0071336 A1 | 3/2005 | Najork et al. |
| 2005/0091672 A1 | 4/2005 | Debique et al. |
| 2005/0262371 A1 | 11/2005 | Luke et al. |
| 2005/0289237 A1 | 12/2005 | Matsubara et al. |
| 2006/0041844 A1 | 2/2006 | Homiller et al. |
| 2006/0064467 A1 | 3/2006 | Libby |
| 2006/0179083 A1 | 8/2006 | Kulkarni et al. |
| 2006/0206547 A1 | 9/2006 | Kulkarni et al. |
| 2006/0277196 A1 | 12/2006 | Oosawa et al. |
| 2007/0024919 A1 | 2/2007 | Wong et al. |
| 2007/0028215 A1 | 2/2007 | Kamath et al. |
| 2007/0043747 A1 | 2/2007 | Benton et al. |
| 2007/0055703 A1 | 3/2007 | Zimran et al. |
| 2007/0079083 A1 | 4/2007 | Gladwin et al. |
| 2007/0088702 A1 | 4/2007 | Fridella et al. |
| 2007/0100829 A1 | 5/2007 | Allen et al. |
| 2007/0100913 A1 | 5/2007 | Sumner et al. |
| 2007/0136308 A1 | 6/2007 | Tsirigotis et al. |
| 2007/0198710 A1 | 8/2007 | Gopalakrishnan |
| 2007/0214497 A1 | 9/2007 | Montgomery et al. |
| 2007/0220220 A1 | 9/2007 | Ziv et al. |
| 2007/0250552 A1 | 10/2007 | Lango et al. |
| 2007/0294366 A1 | 12/2007 | Ozzie et al. |
| 2008/0005195 A1 | 1/2008 | Li et al. |
| 2008/0046218 A1 | 2/2008 | Dontcheva et al. |
| 2008/0141250 A1 | 6/2008 | Dorn et al. |
| 2008/0208870 A1 | 8/2008 | Tsang |
| 2008/0212616 A1 | 9/2008 | Augustine et al. |
| 2008/0267221 A1 | 10/2008 | Ozzie et al. |
| 2009/0030986 A1 | 1/2009 | Bates |
| 2009/0037514 A1 | 2/2009 | Lankford et al. |
| 2009/0055464 A1 | 2/2009 | Multer et al. |
| 2009/0083394 A1 | 3/2009 | Diot et al. |
| 2009/0094252 A1 | 4/2009 | Wong et al. |
| 2009/0125522 A1 | 5/2009 | Kodama et al. |
| 2009/0138529 A1 | 5/2009 | Bellessort et al. |
| 2009/0144784 A1 | 6/2009 | Li et al. |
| 2009/0192845 A1 | 7/2009 | Gudipaty et al. |
| 2009/0216745 A1 | 8/2009 | Allard et al. |
| 2009/0222741 A1 | 9/2009 | Shaw et al. |

(56) References Cited

U.S. PATENT DOCUMENTS

| | | |
|---|---|---|
| 2009/0271412 A1 | 10/2009 | Lacapra et al. |
| 2009/0271502 A1 | 10/2009 | Xue et al. |
| 2009/0271779 A1 | 10/2009 | Clark |
| 2009/0300071 A1 | 12/2009 | Arcese et al. |
| 2009/0313353 A1 | 12/2009 | Lou et al. |
| 2009/0327405 A1 | 12/2009 | Fitzgerald et al. |
| 2010/0011088 A1 | 1/2010 | Gautier et al. |
| 2010/0146569 A1 | 6/2010 | Janardhan et al. |
| 2010/0198944 A1 | 8/2010 | Ho et al. |
| 2010/0241711 A1 | 9/2010 | Ansari et al. |
| 2010/0293147 A1 | 11/2010 | Snow et al. |
| 2010/0332401 A1 | 12/2010 | Prahlad et al. |
| 2011/0153759 A1 | 6/2011 | Rathod et al. |
| 2011/0154431 A1 | 6/2011 | Walsh et al. |
| 2011/0225293 A1 | 9/2011 | Rathod et al. |
| 2011/0258488 A1 | 10/2011 | Nightingale et al. |
| 2012/0084379 A1 | 4/2012 | Peng et al. |
| 2012/0151201 A1 | 6/2012 | Clerc et al. |
| 2012/0197844 A1 | 8/2012 | Wang et al. |
| 2012/0203817 A1 | 8/2012 | Hu et al. |
| 2012/0221520 A1 | 8/2012 | Garrett et al. |
| 2012/0221811 A1 | 8/2012 | Sparkes et al. |
| 2012/0226649 A1 | 9/2012 | Kovacs et al. |
| 2013/0013560 A1 | 1/2013 | Goldberg et al. |
| 2013/0014023 A1 | 1/2013 | Lee et al. |
| 2013/0041872 A1 | 2/2013 | Aizman et al. |
| 2013/0073689 A1 | 3/2013 | Kolam et al. |
| 2013/0080919 A1 | 3/2013 | Kiang et al. |
| 2013/0094445 A1 | 4/2013 | De et al. |
| 2013/0135608 A1 | 5/2013 | Payne et al. |
| 2013/0138608 A1 | 5/2013 | Smith |
| 2013/0138619 A1* | 5/2013 | Krislov ............... G06F 21/6209 707/695 |
| 2013/0160072 A1 | 6/2013 | Reus et al. |
| 2013/0191339 A1 | 7/2013 | Haden et al. |
| 2013/0198600 A1 | 8/2013 | Lockhart et al. |
| 2013/0212112 A1 | 8/2013 | Blom et al. |
| 2013/0212484 A1 | 8/2013 | Joshi et al. |
| 2013/0212485 A1 | 8/2013 | Yankovich et al. |
| 2013/0218837 A1 | 8/2013 | Bhatnagar et al. |
| 2013/0227083 A1 | 8/2013 | Kim et al. |
| 2013/0268480 A1 | 10/2013 | Dorman |
| 2013/0275398 A1 | 10/2013 | Dorman et al. |
| 2013/0275509 A1 | 10/2013 | Micucci et al. |
| 2013/0297887 A1 | 11/2013 | Woodward et al. |
| 2013/0318229 A1 | 11/2013 | Bakre et al. |
| 2013/0318593 A1* | 11/2013 | Smith ................ G06F 16/907 726/9 |
| 2013/0332418 A1 | 12/2013 | Kim |
| 2013/0339407 A1 | 12/2013 | Sharpe et al. |
| 2013/0346374 A1 | 12/2013 | Wolf et al. |
| 2013/0346557 A1 | 12/2013 | Chang et al. |
| 2014/0013112 A1* | 1/2014 | Cidon ................ G06F 16/137 713/165 |
| 2014/0025948 A1 | 1/2014 | Bestler et al. |
| 2014/0032710 A1* | 1/2014 | Shin ................... H04L 67/1004 709/217 |
| 2014/0046906 A1 | 2/2014 | Patiejunas et al. |
| 2014/0047070 A1 | 2/2014 | Lee et al. |
| 2014/0053227 A1 | 2/2014 | Ruppin et al. |
| 2014/0059642 A1 | 2/2014 | Deasy et al. |
| 2014/0067990 A1* | 3/2014 | Abdelhameed ....... G06F 16/972 709/213 |
| 2014/0074663 A1 | 3/2014 | Alsina et al. |
| 2014/0074783 A1 | 3/2014 | Alsina et al. |
| 2014/0101310 A1* | 4/2014 | Savage ................ H04L 43/00 709/224 |
| 2014/0101434 A1* | 4/2014 | Senthurpandi .......... G06F 21/32 713/150 |
| 2014/0115115 A1 | 4/2014 | Kuang et al. |
| 2014/0122428 A1 | 5/2014 | Zhou et al. |
| 2014/0126800 A1 | 5/2014 | Lang et al. |
| 2014/0143446 A1 | 5/2014 | Jacobson et al. |
| 2014/0149794 A1* | 5/2014 | Shetty ................ G06F 16/183 714/20 |
| 2014/0156793 A1 | 6/2014 | Chan et al. |
| 2014/0164315 A1* | 6/2014 | Golshan ................ G06F 16/93 707/608 |
| 2014/0172783 A1 | 6/2014 | Suzuki et al. |
| 2014/0173027 A1 | 6/2014 | Kappes et al. |
| 2014/0173137 A1 | 6/2014 | Jacobson et al. |
| 2014/0181697 A1 | 6/2014 | Kirigin |
| 2014/0188803 A1 | 7/2014 | James et al. |
| 2014/0195652 A1 | 7/2014 | Yerkes |
| 2014/0208220 A1 | 7/2014 | Watal |
| 2014/0215303 A1* | 7/2014 | Grigorovitch ........ G06F 40/106 715/229 |
| 2014/0215436 A1 | 7/2014 | Deluca et al. |
| 2014/0215551 A1 | 7/2014 | Allain et al. |
| 2014/0215568 A1 | 7/2014 | Kirigin et al. |
| 2014/0229839 A1 | 8/2014 | Lynch et al. |
| 2014/0250073 A1 | 9/2014 | Zalpuri et al. |
| 2014/0280602 A1 | 9/2014 | Quatrano |
| 2014/0304384 A1 | 10/2014 | Varenhorst et al. |
| 2014/0304618 A1 | 10/2014 | Carriero et al. |
| 2014/0324777 A1 | 10/2014 | Novak et al. |
| 2014/0324945 A1 | 10/2014 | Novak et al. |
| 2014/0330874 A1 | 11/2014 | Novak et al. |
| 2014/0358860 A1 | 12/2014 | Wautier et al. |
| 2014/0359465 A1 | 12/2014 | Litan et al. |
| 2014/0365432 A1 | 12/2014 | Jain et al. |
| 2014/0379586 A1 | 12/2014 | Sawyer |
| 2015/0006146 A1 | 1/2015 | Wilkes et al. |
| 2015/0006475 A1 | 1/2015 | Guo et al. |
| 2015/0019432 A1 | 1/2015 | Burns et al. |
| 2015/0046557 A1 | 2/2015 | Rosenberg |
| 2015/0052392 A1 | 2/2015 | Mickens et al. |
| 2015/0058932 A1 | 2/2015 | Faitelson et al. |
| 2015/0082198 A1 | 3/2015 | Destagnol et al. |
| 2015/0113222 A1 | 4/2015 | Naik et al. |
| 2015/0134808 A1 | 5/2015 | Fushman et al. |
| 2015/0142742 A1 | 5/2015 | Hong |
| 2015/0149410 A1* | 5/2015 | Haon ................ G06F 16/48 707/627 |
| 2015/0161016 A1 | 6/2015 | Bulkowski et al. |
| 2015/0172120 A1* | 6/2015 | Dwarampudi .......... G06F 3/061 709/221 |
| 2015/0180948 A1 | 6/2015 | Shao |
| 2015/0186395 A1 | 7/2015 | Yan et al. |
| 2015/0207844 A1 | 7/2015 | Tataroiu et al. |
| 2015/0227757 A1 | 8/2015 | Bestler et al. |
| 2015/0249647 A1 | 9/2015 | Mityagin et al. |
| 2015/0254320 A1 | 9/2015 | Cowling et al. |
| 2015/0261732 A1* | 9/2015 | Kim ................ G06F 40/166 715/229 |
| 2015/0278168 A1* | 10/2015 | Hawa ................ G06F 40/134 715/205 |
| 2015/0278764 A1* | 10/2015 | Patil ................ G06F 16/93 705/301 |
| 2015/0278884 A1 | 10/2015 | Manzari et al. |
| 2015/0288754 A1 | 10/2015 | Mosko et al. |
| 2015/0288755 A1 | 10/2015 | Mosko et al. |
| 2015/0347552 A1 | 12/2015 | Habouzit et al. |
| 2015/0347553 A1 | 12/2015 | Aizman et al. |
| 2015/0358373 A1 | 12/2015 | Famaey et al. |
| 2016/0006646 A1 | 1/2016 | Lin et al. |
| 2016/0021172 A1 | 1/2016 | Mahadevan et al. |
| 2016/0044126 A1 | 2/2016 | Mahadevan et al. |
| 2016/0050177 A1 | 2/2016 | Cue et al. |
| 2016/0055248 A1 | 2/2016 | Goel et al. |
| 2016/0057217 A1 | 2/2016 | Beaverson et al. |
| 2016/0062963 A1 | 3/2016 | Umapathy |
| 2016/0078068 A1 | 3/2016 | Agrawal et al. |
| 2016/0087931 A1 | 3/2016 | Kim et al. |
| 2016/0092443 A1 | 3/2016 | Hayes et al. |
| 2016/0154817 A1* | 6/2016 | Mason, Jr ........... G06F 16/1774 707/704 |
| 2016/0164761 A1 | 6/2016 | Sathyanarayana et al. |
| 2016/0217387 A1 | 7/2016 | Okanohara et al. |
| 2016/0224548 A1* | 8/2016 | Massand ................ G06F 16/93 |
| 2016/0226970 A1 | 8/2016 | Newhouse et al. |

(56) References Cited

U.S. PATENT DOCUMENTS

| | | | |
|---|---|---|---|
| 2016/0267103 A1 | 9/2016 | Slik et al. | |
| 2016/0291856 A1* | 10/2016 | von Muhlen | H04L 67/10 |
| 2016/0292179 A1 | 10/2016 | Von Muhlen et al. | |
| 2016/0292443 A1 | 10/2016 | Von Muhlen et al. | |
| 2016/0313934 A1 | 10/2016 | Isherwood et al. | |
| 2016/0321311 A1* | 11/2016 | Tallamraju | G06F 9/46 |
| 2016/0321338 A1 | 11/2016 | Isherwood et al. | |
| 2016/0371241 A1* | 12/2016 | Wong | G06F 3/0482 |
| 2017/0017551 A1* | 1/2017 | Nichols | H04L 67/1095 |
| 2017/0017779 A1* | 1/2017 | Huang | G06F 40/106 |
| 2017/0078383 A1* | 3/2017 | Murstein | G06F 16/1873 |
| 2017/0103066 A1* | 4/2017 | Kisin | H04L 67/06 |
| 2017/0109370 A1 | 4/2017 | Newhouse | |
| 2017/0124111 A1 | 5/2017 | Sharma et al. | |
| 2017/0124170 A1 | 5/2017 | Koorapati et al. | |
| 2017/0126782 A1 | 5/2017 | Koorapati et al. | |
| 2017/0126800 A1 | 5/2017 | Koorapati et al. | |
| 2017/0126802 A1 | 5/2017 | Koorapati et al. | |
| 2017/0177332 A1 | 6/2017 | Deluca et al. | |
| 2017/0195417 A1 | 7/2017 | Brand | |
| 2017/0208052 A1* | 7/2017 | Jai | G06F 16/172 |
| 2017/0208125 A1* | 7/2017 | Jai | G06F 21/62 |
| 2017/0222865 A1 | 8/2017 | Koorapati et al. | |
| 2017/0249328 A1* | 8/2017 | Liang | G06F 16/182 |
| 2017/0255687 A1 | 9/2017 | Koorapati et al. | |
| 2018/0048687 A1 | 2/2018 | Bryant et al. | |
| 2018/0060410 A1 | 3/2018 | Stading et al. | |
| 2018/0150435 A1* | 5/2018 | Kim | G06F 40/106 |
| 2018/0157467 A1* | 6/2018 | Stachura | G06F 8/34 |
| 2018/0196816 A1* | 7/2018 | Maybee | G06F 21/602 |
| 2018/0343134 A1* | 11/2018 | Press | H04L 12/1827 |
| 2019/0155534 A1* | 5/2019 | Eda | H04L 67/1097 |
| 2019/0155870 A1* | 5/2019 | Prakash | G06F 40/143 |
| 2019/0171729 A1* | 6/2019 | Christiansen | G06F 16/182 |
| 2019/0188187 A1* | 6/2019 | Brand | G06F 16/178 |
| 2019/0295103 A1* | 9/2019 | Tehranchi | G06Q 10/103 |
| 2019/0332688 A1* | 10/2019 | Valentine | G06F 16/955 |
| 2019/0364108 A1* | 11/2019 | Berger | H04L 69/14 |
| 2020/0210383 A1* | 7/2020 | Demaris | G06F 16/168 |
| 2020/0296100 A1* | 9/2020 | Prahlad | G06F 16/908 |
| 2020/0304481 A1* | 9/2020 | Rathore | H04L 63/08 |
| 2020/0358779 A1* | 11/2020 | Momchilov | G06F 16/188 |
| 2021/0055999 A1* | 2/2021 | Bhange | G06F 3/067 |

FOREIGN PATENT DOCUMENTS

| | | |
|---|---|---|
| JP | H0816444 A | 1/1996 |
| JP | 2003030026 A | 1/2003 |
| JP | 2005011354 A | 1/2005 |
| JP | 2005141475 A | 6/2005 |
| JP | 2008538843 A | 11/2008 |
| JP | 2008305221 A | 12/2008 |
| JP | 2010074604 A | 4/2010 |
| JP | 2012079042 A | 4/2012 |
| JP | 2012079043 A | 4/2012 |
| JP | 2012093911 A | 5/2012 |
| JP | 2012513632 A | 6/2012 |
| JP | 2012182292 A | 9/2012 |
| JP | 2013182292 A | 9/2013 |
| JP | 2014038569 A | 2/2014 |
| JP | 2015505627 A | 2/2015 |
| JP | 2015058627 A | 3/2015 |
| JP | 2016505964 A | 2/2016 |
| WO | 2005060387 A3 | 4/2009 |
| WO | 2009124014 A2 | 10/2009 |
| WO | 2010073110 A1 | 7/2010 |
| WO | 2014099044 A1 | 6/2014 |
| WO | 2015031755 A1 | 3/2015 |
| WO | 2015153045 A1 | 10/2015 |

OTHER PUBLICATIONS

Office Action for U.S. Appl. No. 15/010,220 dated Oct. 25, 2016, 15 pages.
Office Action for U.S. Appl. No. 15/010,220 dated Sep. 28, 2017, 24 pages.
Office Action for U.S. Appl. No. 15/010,235 dated May 12, 2016, 11 pages.
Office Action for U.S. Appl. No. 15/332,782 dated Oct. 5, 2018, 39 pages.
Office Action for U.S. Appl. No. 15/355,286 dated Mar. 19, 2019, 17 pages.
Office Action for U.S. Appl. No. 15/355,305 dated May 22, 2017, 11 pages.
Office Action for U.S. Appl. No. 15/603,193 dated Sep. 11, 2017, 11 pages.
Office Action for U.S. Appl. No. 15/870,365 dated Jul. 25, 2019, 14 pages.
Search Report for Japanese Application No. 2017-550811 dated Dec. 20, 2018, 6 pages.
Search Report for Japanese Application No. 2017-550817 dated Dec. 25, 2018, 8 pages.
Second Examination Report for Australian Application No. 2016243644 dated Dec. 18, 2018, 4 pages.
Summons to Attend Oral Proceedings Pursuant to Rule 115(1) EPC for EP Application No. 16791146.0 dated Jan. 13, 2020, 13 pages.
Syncovery, "Syncovery: Blocking Level Copying," downloaded from www.synovery.com/block-level-copying/ on May 22, 2014, 2 pages.
Tridgell A., et al., "TR-CS-96-05 The Rsync Algorithm," Jun. 1996, 8 pages.
White T., "Chapter 3: The Hadoop Distributed Filesystem," Hadoop—The Definitive Guide, 4th Edition, Apr. 17, 2015, pp. 43-78.
Zhu Z., et al., "Let's ChronoSync: Decentralized Dataset State Synchronization in Named Data Networking," 21st IEEE International Conference on Network Protocols (ICNP), 2013, 10 pages.
Final Office Action from U.S. Appl. No. 15/332,782, dated Jan. 22, 2020, 20 pages.
Final Office Action from U.S. Appl. No. 15/984,968, dated Feb. 3, 2020, 20 pages.
Final Office Action from U.S. Appl. No. 15/984,968, dated Sep. 8, 2020, 24 pages.
First Examination Report for Australian Application No. 2016346892 dated Jan. 21, 2019, 3 pages.
First Office Action for Japanese Application No. 2018-504709 dated May 31, 2019, 12 pages.
Griffith-Jones G., "Log file," Wikipedia, XP055701533, Aug. 21, 2015, Retrieved from https://en.wikipedia.org/w/index.php?title=Log_file&oldid=677169702 on Jun. 5, 2020, 3 pages.
Hendrickson M., "Dropbox: The Online Storage Solution We've Been Waiting for?," TechCrunch.com, Mar. 11, 2008, Downloaded from https://techcrunch.com/2008/03/11/dropbox-the-online-storage-solution-wev-e-been-waiting-for/, 6 pages.
International Search Report and Written Opinion for PCT Application No. PCT/US2016/025014, dated Jul. 14, 2016, 11 pages.
International Search Report and Written Opinion for PCT Application No. PCT/US2016/025015, dated Jun. 16, 2016, 11 pages.
International Search Report and Written Opinion for PCT Application No. PCT/US2016/056344, dated Feb. 28, 2017, 22 pages.
International Search Report and Written Opinion for PCT Application No. PCT/US2016/056345, dated Feb. 28, 2017, 20 pages.
International Search Report and Written Opinion for PCT Application No. PCT/US2016/056346, dated Jan. 5, 2017, 11 pages.
International Search Report and Written Opinion for PCT Application No. PCT/US2017/014945, dated Mar. 14, 2017, 11 pages.
International Search Report and Written Opinion for PCT Application No. PCT/US2016/0056349, dated Jan. 18, 2017, 12 pages.
International Search Report for PCT Application No. PCT/US2016/056348, dated Jan. 19, 2007, 14 pages.
Interview Summary for U.S. Appl. No. 14/961,067 dated Oct. 11, 2017, 2 pages.
Interview summary for U.S. Appl. No. 14/979,252 dated Aug. 27, 2019, 3 Pages.
Interview Summary for U.S. Appl. No. 14/979,252 dated Mar. 15, 2019, 4 pages.
Interview Summary for U.S. Appl. No. 15/332,782 dated Oct. 23, 2019, 3 pages.

(56) References Cited

OTHER PUBLICATIONS

Jia A.L., et al., "Designs and Evaluation of a Tracker in P2P Networks", Peer-to-Peer Computing, 2008, P2P'08, Eighth International Conference on IEEE, Piscataway, NJ, USA, ISBN 978-0-7695-3318-6, Sep. 8, 2008, pp. 227-230.
Koorapati N., "Streaming File Synchronization," Dropbox Tech Blog, Jul. 11, 2014, 14 pages.
Lefebvre R., "Mastering iCloud on Your Mac: Use iClouDrive to Access Your Files Like Dropbox [OS X Tips]," Posted on Mar. 28, 2013 at Cult of Mac, retrieved on Oct. 17, 2016, 3 pages.
Li B., "Simplifying Data Management: NFS access to HDFS," Hortonworks, May 13, 2013, retrieved from http://nortonworks.com/blog/simplifying-data-management-nfs-access-to-hdfs/, 13 pages.
Nikkei Business Publications Inc., "One Device for on the Go or at Home! Evolution of the Notebook PC, Windows Tablet Complete Strategy, PC Cooperation Volume: Simple File Sharing Via Cloud", Nikkei PC21, Aug. 24, 2014, vol. 19(14), pp. 30-35 (11 pages).
Non-Final Office Action from U.S. Appl. No. 15/870,365, dated Apr. 15, 2020, 15 pages.
Non-Final Office Action from U.S. Appl. No. 15/891,296, dated Jan. 16, 2020, 12 pages.
Non-Final Office Action from U.S. Appl. No. 15/984,968, dated May 20, 2020, 17 pages.
Non-Final Office Action from U.S. Appl. No. 15/984,968, dated Oct. 3, 2019, 17 pages.
Notice of Acceptance for Australian Application No. 2016242857 dated Dec. 18, 2018, 3 pages.
Notice of Allowance from U.S. Appl. No. 14/979,252, dated Apr. 2, 2020, 6 pages.
Notice of Allowance from U.S. Appl. No. 14/979,252, dated Apr. 24, 2020, 3 pages.
Notice of Allowance from U.S. Appl. No. 14/979,252, dated Dec. 11, 2019, 11 pages.
Notice of Allowance from U.S. Appl. No. 14/979,252, dated May 19, 2020, 2 pages.
Notice of Allowance from U.S. Appl. No. 15/332,782, dated Apr. 6, 2020, 11 pages.
Notice of Allowance from U.S. Appl. No. 15/332,782, dated Apr. 29, 2020, 13 pages.
Notice of Allowance from U.S. Appl. No. 15/355,286, dated Jan. 15, 2020, 5 pages.
Notice of Allowance from U.S. Appl. No. 15/355,286, dated Jul. 8, 2020, 2 pages.
Notice of Allowance from U.S. Appl. No. 15/870,365, dated Aug. 17, 2020, 12 pages.
Notice of Allowance from U.S. Appl. No. 15/870,365, dated Jan. 23, 2020, 2 pages.
Notice of Allowance from U.S. Appl. No. 15/870,365, dated Nov. 8, 2019, 11 pages.
Notice of Allowance from U.S. Appl. No. 15/891,296, dated Apr. 29, 2020, 8 pages.
Moticeof Allowance for U.S. Appl. No. 14/961,067 dated Nov. 6, 2017, 10 pages.
Notice of Allowance for U.S. Appl. No. 14/979,234 dated Jun. 13, 2016, 14 pages.
Notice of Allowance for U.S. Appl. No. 14/979,256 dated Aug. 5, 2016, 8 pages.
Notice of Allowance for U.S. Appl. No. 14/979,268 dated Mar. 23, 2017, 9 pages.
Notice of Allowance for U.S. Appl. No. 15/010,235 dated Aug. 30, 2016, 7 pages.
Notice of Allowance for U.S. Appl. No. 15/355,305 dated Sep. 22, 2017, 5 pages.
Notice of Allowance for U.S. Appl. No. 15/603,193 dated Jul. 10, 2018, 8 pages.
Notice of Allowance for U.S. Appl. No. 15/010,220 dated Feb. 22, 2018, 9 pages.
Office Action for U.S. Appl. No. 14/961,067 dated Jul. 7, 2017, 13 pages.

Office Action for U.S. Appl. No. 14/979,226 dated Jun. 16, 2016, 8 pages.
Office Action for U.S. Appl. No. 14/979,226 dated Mar. 23, 2017, 10 pages.
Office Action for U.S. Appl. No. 14/979,226 dated Nov. 16, 2016, 10 pages.
Office Action for U.S. Appl. No. 14/979,252 dated Dec. 14, 2018, 30 pages.
Office Action for U.S. Appl. No. 14/979,252 dated May 23, 2016, 17 pages.
Office Action for U.S. Appl. No. 14/979,252 dated Oct. 26, 2017, 24 pages.
Office Action for U.S. Appl. No. 14/979,256 dated May 4, 2016, 11 pages.
Office Action for U.S. Appl. No. 14/979,268 dated May 18, 2016, 20 pages.
Australian Claims in application No. 2016346892, dated Jan. 2019, 9 pages.
Barr, J., "Amazon S3: Multipart Upload," Nov. 10, 2010, Retrieved from https://aws.amazon.com/blogs/aws/amazon-s3-multipart-upload/ on Feb. 3, 2015, 3 pages.
Bonadea, et al., "Cloud Storage," Wikipedia, Oct. 28, 2015, downloaded from https://en.wikipedia.org/w/index.php?title=Cloud_storage&oldid=687899972 on Dec. 20, 2016, 5 pages.
Brim M., "Control and Inspection of Distributed Process Groups at Extreme Scale via Group File Semantics," ProQuest Dissertations Publishing, 2012, Dissertation/thesis No. 3508182, 202 pages.
Camacho H.E., et al., "A Cloud Environment for Backup and Data Storage", International Conference on Electronics, Communications and Computers (CONIELECOMP), 2014, 7 pages.
Claims for Japanese Application No. 2017-550811 dated Dec. 2018, 4 pages.
Claims for Japanese Application No. 2017-550817 dated Dec. 2018, 4 pages.
Claims for Japanese Application No. 2018-504709 dated May 2019, 9 pages.
Claims in Australian Application No. 2016242857, dated Dec. 2018, 4 pages.
Claims in Australian Application No. 2016243644, dated Dec. 2018, 4 pages.
Communication Pursuant to Article 94(3) EPC for European Application No. 16791147.8 mailed on Nov. 28, 2019, 4 pages.
Communication Pursuant to Article 94(3) for EP Application No. 16715433.5 dated Oct. 9, 2019, 6 pages.
Communication Pursuant to Article 94(3) EPC for European Application No. 17703601.9 mailed on Mar. 4, 2020, 8 pages.
Communication Pursuant to Article 94(3) for EP Application No. 16791147.8 dated Feb. 18, 2019, 5 pages.
Communication under rule 71(3) EPC for European Application No. 16715433.5 mailed on Jul. 20, 2020, 42 pages.
Communication under rule 71(3) EPC Intention to Grant for European Application No. 16791147.8 dated Apr. 30, 2020, 7 pages.
Communication under Rule 71(3) EPC of Intention to Grant for European Application No. 16790778.1 dated May 4, 2020, 7 pages.
Communication under Rule 71(3) EPC of Intention to Grant for European Application No. 16791148.6 dated May 11, 2020, 7 pages.
Result of consultation for European Application No. 16715433.5 mailed on May 28, 2020, 3 pages.
Current Claims in PCT Application No. PCT /US2016/0056349, dated Jan. 2017, 3 pages.
Current Claims in PCT Application No. PCT/US2016/056348, dated Jan. 2017, 4 pages.
Dee M., "Inside LAN Sync", DropBox Tech Blog, Oct. 13, 2015, 9 pages.
Drago I., et al., "Inside Dropbox: Understanding Personal Cloud Storage Services," Proceedings of the 2012 ACM Conference on Internet Measurement Conference, IMC, XP055131706, Nov. 14, 2012, vol. 16, 14 pages.
"Dropbox Screenshot," Publically available Jul. 3, 2013, retrieved from http://www.filewin.net/Dropbox/] via Internet Archive on Oct. 17, 2016, 2 pages.
European Claims in application No. 16791146.0, dated Dec. 2018, 4 pages.

(56) References Cited

OTHER PUBLICATIONS

European Claims in application No. 16791147.8, dated Feb. 2019, 5 pages.
European Claims in PCT Application No. PCT/US2016/025014, dated Jul. 2016, 7 pages.
European Claims in PCT Application No. PCT/US2016/025015, dated Jun. 2016, 6 pages.
European Claims in PCT Application No. PCT/US2016/056344, dated Feb. 2017, 4 pages.
European Claims in PCT Application No. PCT/US2016/056345, dated Feb. 2017, 6 pages.
European Claims in PCT Application No. PCT/US2016/056346, dated Jan. 2017, 9 pages.
European Claims in PCT Application No. PCT/US2017/014945, dated Mar. 2017, 4 pages.
European Search Report for EP Application No. 16791146.0 dated Dec. 7, 2013, 15 pages.
Extended European Search Report for EP Application No. 20152072.3 dated Jun. 16, 2020, 11 pages.
Final Office Action for U.S. Appl. No. 14/979,252 dated Jul. 1, 2019, 24 pages.
Final Office Action for U.S. Appl. No. 14/979,252 dated May 3, 2018, 27 pages.
Final Office Action for U.S. Appl. No. 14/979,252 dated Nov. 21, 2016, 22 pages.
Final Office Action for U.S. Appl. No. 14/979,268 dated Nov. 18, 2016, 15 pages.
Final Office Action for U.S. Appl. No. 15/010,220 dated Feb. 22, 2017, 22 pages.
Final Office Action for U.S. Appl. No. 15/332,782 dated Feb. 7, 2019, 28 pages.
Final Office Action for U.S. Appl. No. 15/355,286 dated Aug. 29, 2019, 12 pages.
Final Office Action for U.S. Appl. No. 15/603,193 dated Jan. 29, 2018, 21 pages.

* cited by examiner

AT TIME = 0

IMMEDIATE CLOUD CONTENT ITEM CREATION FROM LOCAL FILE SYSTEM INTERFACE

TECHNICAL FIELD

The present technology generally pertains to creating a cloud content item from a local file system interface, and more specifically, the present technology pertains to an immediate creation of a representation of the cloud content item in the local file system.

BACKGROUND

When a user of a computing device makes an input into a computing device they expect to see an immediate response. In general, computing devices have been at a level of responsiveness such that some immediate response is taken for granted. Such computing performance has made it so that when a computing device does not provide an immediate response, the user assumes something is wrong. For actions that might require some patience, it is important to design a user experience that at least signals that action is being taken.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
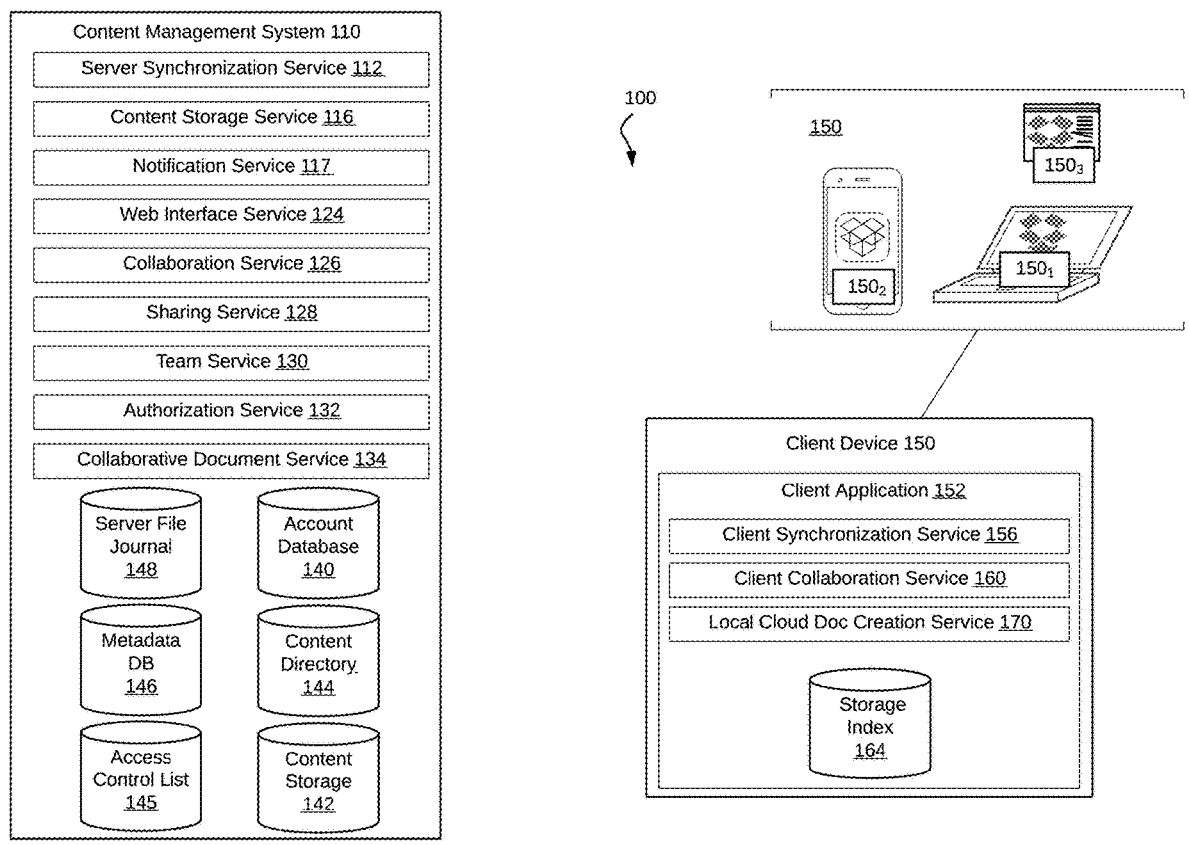
FIG. 1 shows an example of a content management system and client devices in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art for a technology that can provide a user experience on a client device that is responsive to user inputs and that simultaneously allows time for communications to a server and processing by multiple servers.

Specifically, when functionality to create a cloud content item from a file system of a client device is made available to a user, the user is exposed to two competing user experience paradigms that can result in a poor user experience. Users are accustomed to some latency, at least to load a document in a webpage in an Internet browser, when working with cloud content items. However, users expect actions taken on a local file system of a client device to be immediate. They are not accustomed to a user experience that shows local content items to also include content items that require server actions for content item creation. As such, even when creating a cloud content item using a local file system, users expect the same responsiveness they are accustomed to from the local file system, and when they don't experience such responsiveness the user forms a negative impression.

The present technology addresses this problem by immediately creating a content item that is representative of a cloud content item once the user requests a cloud content item to be created. The content item that is representative of the cloud content item is created even before the cloud content item itself is created. Since the content item that is representative of the cloud content item is represented in the file system on the client device, the user receives an experience that matches their expectations.

However, creating the content item that is representative of the cloud content item prior to the existence of the cloud content item creates other challenges. One such challenge is that the cloud content item needs to be created and once created the content item that is representative of the cloud content item need to be linked in some way such that when the user selects the content item that is representative of the cloud content item, the cloud content item opens. Accordingly, after the cloud content item is created, the present technology provides a mechanism to update content item that is representative of the cloud content item. The present technology also contains an additional mechanism whereby the content management system can relate the content item that is representative of the cloud content item with the actual cloud content item.

Another challenge is that since the content item that is representative of the cloud content item exists prior to the existence of the cloud content item, a user might attempt to access the cloud content item before it exists by selecting the content item that is representative of the cloud content item. The present technology includes a mechanism whereby the creation of the cloud content item can be prioritized in such circumstances.

In some embodiments, the disclosed technology is deployed in the context of a content management system having content item synchronization capabilities and collaboration features, among others. An example system configuration 100 is shown in FIG. 1, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database

140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata database 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata database 146 can store the content path for each content item as part of a content entry.

In some embodiments, the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata database 146, in association with the unique ID of the content item.

Content storage service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content storage service can provide the ability to undo operations, by using a content item version control that tracks changes to content items, different versions of content items (including diverging version trees), and a change history that can be acquired from the server file journal 148.

Content Item Synchronization

Another feature of content management system 110 is synchronization of content items with at least one client device 150. Client device(s) can take different forms and have different capabilities. For example, client device 150$_1$ is a computing device having a local file system accessible by multiple applications resident thereon. Client device 150$_2$ is a computing device wherein content items are only accessible to a specific application or by permission given by the specific application, and the content items are typically stored either in an application specific space or in the cloud. Client device 150$_3$ is any client device accessing content management system 110 via a web browser and accessing content items via a web interface. While example client devices 150$_1$, 150$_2$, and 150$_3$ are depicted in form factors such as a laptop, mobile device, or web browser, it should be understood that the descriptions thereof are not limited to devices of these example form factors. For example a mobile device such as client 150$_2$ might have a local file system accessible by multiple applications resident thereon, or client 150$_2$ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments, client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management storage service 116. In some embodiments, client synchronization service 156 can perform some functions of content management storage service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update server file journal 148, metadata database 146, content directory 144, content storage 142, account database 140, etc. as appropriate.

When synchronizing from content management system 110 to client device 150, a mount, modification, addition, deletion, move of a content item recorded in server file journal 148 can trigger a notification to be sent to client device 150 using notification service 117. When client device 150 is informed of the change a request changes listed in server file journal 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments, a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Team Service

In some embodiments, content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Teams service 130 can provide a common shared space for the team, private user account folders, and access limited shared folders. Teams service can also provide a management interface for an administrator to manage collections and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments, content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments, this can be managed by requiring two users access a content item through a web interface and there they can work on the same copy of the content item at the same time.

Collaboration Companion Interface

In some embodiments, client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application.

In some embodiments, client application 152 on client device 150 can be enabled with functionality to create cloud content items through local cloud content item creation service 170. In some embodiments, a collaborative document such as provided by collaborative document service 134 is one type of cloud content item. A cloud content item is a content item that only resides in the cloud. Examples of cloud content items include GOOGLE DOCS, and DROPBOX PAPER. Notwithstanding the fact that cloud content items reside in the cloud, the present technology can create a client content item that represents the cloud content item, which gives the appearance that the cloud content item is synchronized to client application 152.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
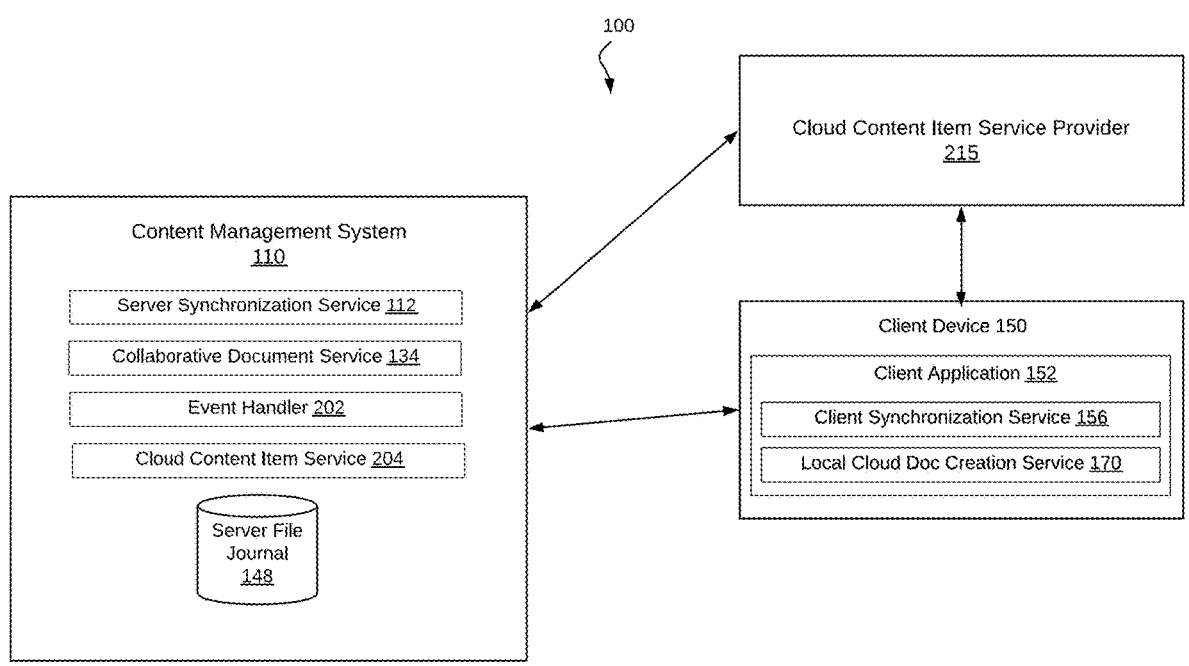
FIG. 2 illustrates a simplified example of a content management system and client devices in accordance with some aspects of the present technology.

FIG. 2 illustrates a simplified version of system 100. In addition to those services illustrated in FIG. 1, FIG. 2 also illustrates event handler 202 and cloud content item service 204. Event handler 202 can be representative of one or more event handlers useful in the creation of cloud content items and/or directing client device 150 to display a cloud content item in coordination with cloud content item service 204. Cloud content item service 204 can act as a target for uniform resource locators (URL) provided to client application 152 for accessing cloud content items managed by content management system 110. As such cloud content item service 204 can receive requests for creating or retrieving cloud content items and can communicate with cloud content item service providers to create or present cloud content items.

FIG. 2 also illustrates two examples of cloud content item service providers. The first example is cloud content item service provider 215 which represents a third party cloud content item service provider. The second example is collaborative document service 134, which is a type of cloud content item service provided by content management system 110.

Greater detail with respect to the functions of the entities represented in FIG. 2 will be provided below.

Figure 3A:
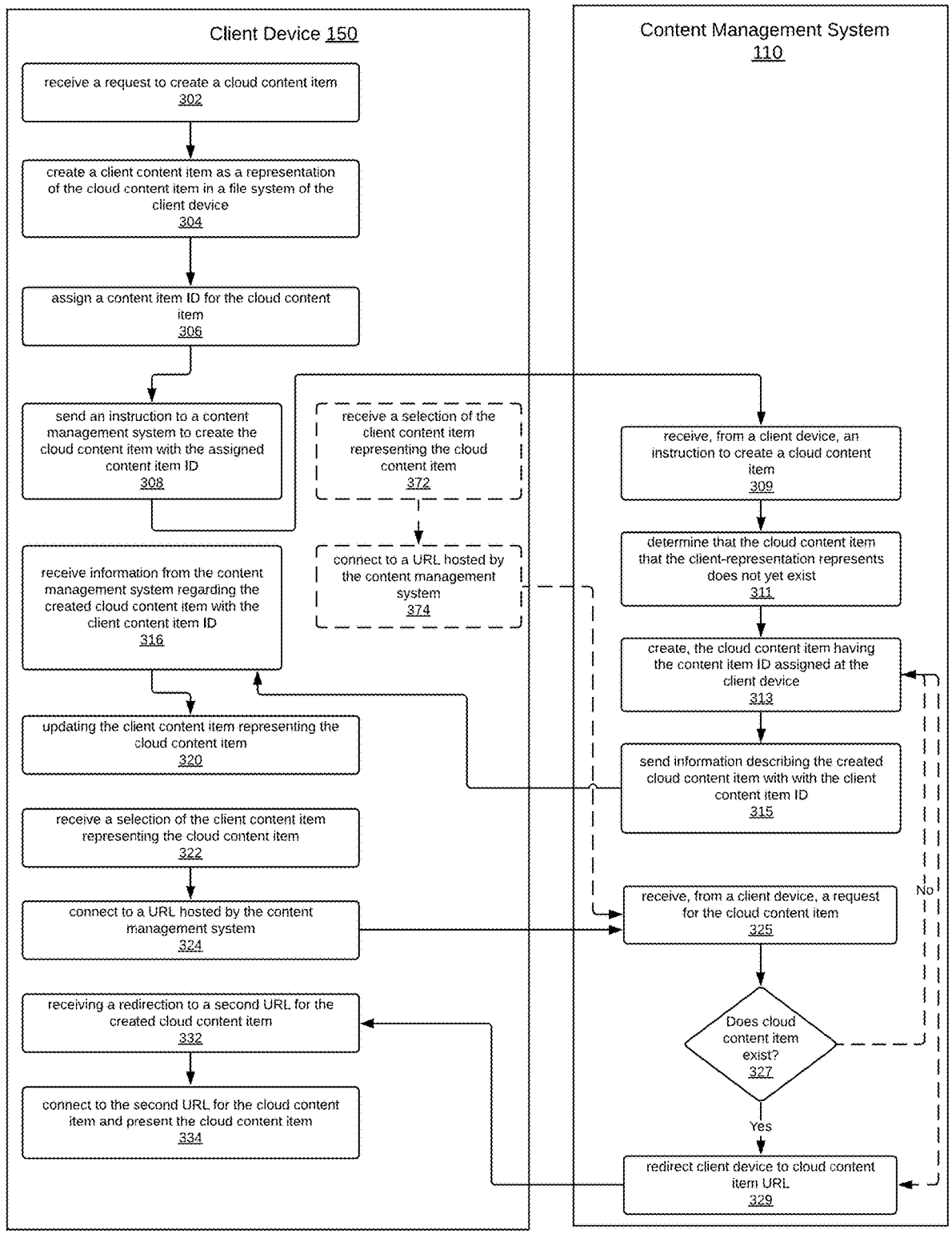
FIG. 3A and FIG. 3B illustrate example methods whereby a client application can create a client content item representing a cloud content item immediately after a request to create the cloud content item in accordance with some aspects of the present technology.

FIG. 3A illustrates an example method embodiment in accordance with some aspects of the present technology. More specifically FIG. 3A illustrates a method whereby a user may request to create a cloud content item using client application 152 and client application 152 can create a client content item representing the cloud content item immediately, even before cloud content item service 204 is informed of the request to create the cloud content item. The client content item can be a file that is native to the file system of the client device and can be stored on the file system of the client device.

While FIG. 3A may appear to be a synchronous process, aspects of the method illustrated in FIG. 3A can be asynchronous. The arrangement of steps displayed in FIG. 3A is for convenience of explanation and the present technology does not require that these steps are performed in the illustrated order. For example, portions of FIG. 3A represent requesting (302) to create a cloud content item on client device 150, creating (304) a client content item as a representation of the cloud content item on client device 150, creating (313) the cloud content item by content management system 110, receiving a selection (322) of the client content item on client device 150 in order to view (334) the cloud content item. Each of these portions of FIG. 3A can be asynchronous.

The method illustrated in FIG. 3A begins when client application 152 receives (302) a request to create a cloud content item. Local cloud content item creation service 170 can create (304) a client content item as a representation of the cloud content item in a file system of client device 150. As part of this process local cloud content item creation service 170 can assign (306) a content item ID for the cloud content item.

It can be advantageous if the content item ID for the cloud content item does not conflict with any other content item ID that is managed by content management system 110. As such, local cloud content item creation service 170 can generate a portion of a content item ID in a format that is similar to the format of content item IDs ordinarily generated by content management system 110, and to ensure that the generated portion of the content item ID does not conflict with any other content item ID that is managed by the content management system 110, local cloud content item creation service 170 can prepend or append a namespace to the generated portion of the content item ID. Thus, in some embodiments, the content item ID for the cloud content item consists of a namespace plus the generated portion of the content item ID.

In some embodiments, the namespace portion of the content item ID can be guaranteed to be unique itself, which ensures that the content item ID is unique. The namespace portion of the content item ID can be a hostID of client device 150 generated in coordination with content managements system 110. The hostID corresponds to a specific content management system 110 user ID being signed into a specific installation of client application 152 on a given client device 150. The hostID guaranteed to be unique because this identifier is generated at the time the user ID signs into the client application 152 and as such content management system 110 will issue this unique user ID.

In some embodiments, the generated portion of the content item ID can be a string of arbitrary (e.g., pseudo-randomly generated) characters. In some embodiments, the string can have a predefined length.

The content item ID for the cloud content item can be stored as a metadata attribute of the client content item that is a representation of the cloud content item. In some embodiments, other data can also be stored as a metadata attribute of the client content item that is a representation of the cloud content item. For example a title of the cloud content item can be provided by the user and stored as metadata. In another example, a designation of the content item as a representation of a cloud content item can be stored in metadata. Additionally a URL pointing to cloud content item service 204 can also be stored in metadata. In some embodiments, the metadata can take the form of extended attributes or alternate data streams associated with the client content item.

While steps 304 and 306 appear in sequence it will be appreciated by those of ordinary skill in the art that steps 304 and 306 can also occur in a different order, asynchronously, or simultaneously.

After the client content item is created (304) and has been assigned (306) at least a content item ID for the cloud content item, client application 152 can send an instruction (308) to content management system 110 to create the cloud content item with the assigned content item ID.

The instruction can be received (309) by event handler 202 which can determine (311) based on the content item ID that the cloud content item does not yet exist and can pass the request to cloud content item service 204.

Cloud content item service 204 can create (313) the cloud content item having the content item ID assigned by the client device. In some embodiments, cloud content item service 204 creates (313) the cloud content item by communicating with cloud content item service provider 215 (or collaborative document service 134) via published application programming interfaces (APIs), while at the same time recording the existence of the created cloud content item with the cloud content item service provider in server file journal 148.

After the cloud content item has been created content management system 110 can send (315) information describing created cloud content item to client device 150.

Client device 150 can receive (316) the information from content management system 110 regarding the created cloud content item, and can update (320) the client content item representing the cloud content item with any new or revised information. Since the client content item representing the cloud content item was created before the cloud content item, the client content item may include placeholder information that needs to be replaced once the cloud content item is actually created. In some embodiments the information received from content management system that is used to update (320) the client content item can include information indicating that the cloud content item was created, an updated reference to the actual location in the cloud where the cloud content item exists (e.g., in the form of a URL), an updated content item ID for the cloud content item (e.g., if the originally assigned content item ID was found to conflict with an existing content item ID on content management system 110), or any other relevant information.

As soon as the client content item representing the cloud content item is presented in a file system user interface on client device 150, a user can select the client content item in an attempt to open the cloud content item. Client application 152 can receive (322) a selection of the local content item representing the cloud content item, and in response can connect (324) to a URL stored as metadata with the local content item that points to cloud content item service 204 at content management system 110.

Cloud content item service 204 can receive (325) a request for the cloud content item. Cloud content item service 204 can determine (327) whether the cloud content item exists by referencing server file journal 148 or other resource at content management system 110. Cloud content item service 204 can identify a URL for the cloud content item at the cloud content item provider and can redirect (329) the client device to that URL.

Client application 152 can receive (332) the redirection to the URL provided by cloud content item service 204 and can connect (334) to the URL for the cloud content item and present it to the user.

However, in some embodiments, when cloud content item service 204 receives (325) request for the cloud content item, cloud content item service 204 may determine (327) that the cloud content item does not exist. This can occur because the creation of the cloud content item is an asynchronous process. One objective of the present technology is to provide a user interface on client device 150 to allow a user to create a cloud content item that is also associated with a good user experience. However, as explained above, the creation of a cloud content item may come with some period of delay, and if the present technology did not immediately create a client content item that is a representation of the cloud content item the user may think the process of creating the cloud content item failed when the process of creating the cloud content item is really just delayed.

Since the client content item immediately exists, it is available to be the subject of some user interactions, even if the corresponding cloud content item has not yet been created. For example, since the client content item is a content item on the local file system of client device 150, a user can rename the content item, or move the content item to another directory. In some embodiments, renaming the client content item can cause the cloud content item to be named with the file name of the client content item and as such, some interactions with the client content item can affect the cloud content item. However, changing the location of the client content item to a different directory might not have any effect on the cloud content item.

The immediate creation of the client content item as a representation of the cloud content item can create a race situation wherein content management system 110 may not have created the cloud content item yet, but a user of client device 150 can request to open the cloud content item. FIG. 3A illustrates an example flow in dashed lines showing an alternative sequence of steps for when the user of client device 150 requests to open the cloud content item before cloud content item service 204 has created the cloud content item.

For example, client device 150 can receive (372) a selection of the client content item wherein the user of client device 150 wishes to open the cloud content item that it represents. Client application 152 can connect (374) to the URL stored in the metadata of the client content item which points to cloud content item service 204. Cloud content item service 204 can receive (325) the request for the cloud content item and can determine (327) that the content item does not exist. In response cloud content item service 204 can proceed to create (313) the cloud content item, and once the cloud content item is created the method can proceed to both steps 315, in order to update the client device of the creation of the cloud content item, and to step 329, in order to fulfill the users request to access the cloud content item.

Figure 3B:
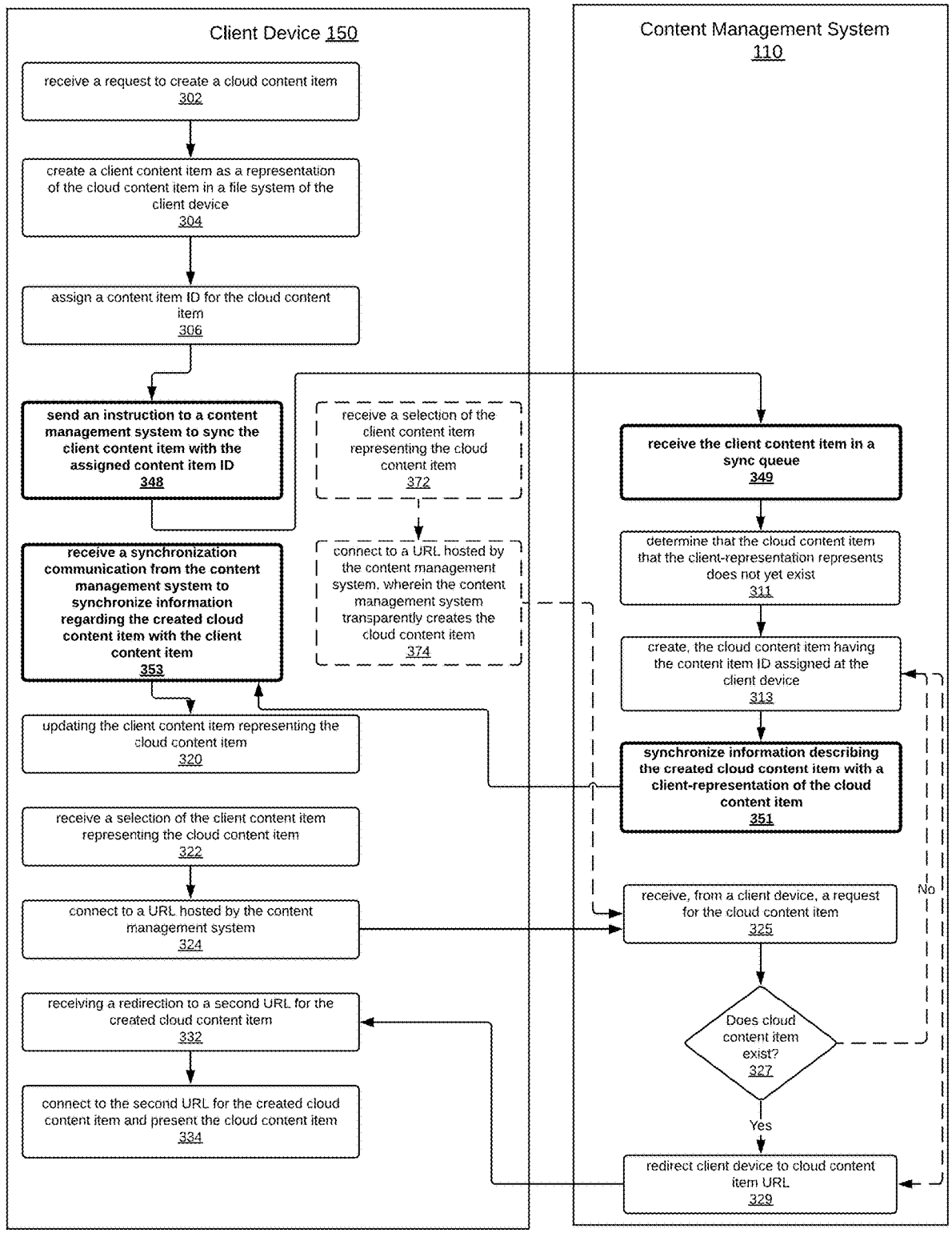

FIG. 3B illustrates a variation on the method illustrated in FIG. 3A. Specifically, FIG. 3B illustrates a method of the present technology that is specific to an embodiment that takes advantage of synchronization infrastructure of content management system 110 and client application 152. The method illustrated in FIG. 3B is the same as the method illustrated in FIG. 3A except for the bolded steps 348, 349, 351 and 353.

Specifically, after the client content item representing the cloud content item has been created (304) and has been assigned (306) a content item ID, the client content item can be synchronized (348) by client synchronization service 156 as client synchronization service 156 would do with any other content item stored in a directory for which it is responsible.

Server synchronization service 112 at content management system 110 can receive (349) the client content item from the synchronization queue of client synchronization service 156. When processing the local content item in the synchronization process, server synchronization service 112 can determine (311) that the client content item represents a cloud content item that does not exist and can create an error that is passed to event handler 202. Event handler 202 can determine that the solution to this error is to instruct cloud content item service 204 to create (313) the cloud content item having the content item ID assigned at the client device.

In some embodiments, synchronization events pertaining to creating a cloud content item can be prioritized in the synchronization queue.

Once the cloud content item has been created (313), server synchronization service 112 can synchronize (351) information describing the created cloud content item with the local content item which can be received (353) by client synchronization service 156 which can synchronize information regarding the created cloud content item with the local content item. For example, since the client content item representing the cloud content item was created before the cloud content item, the client content item may include placeholder information that needs to be replaced once the cloud content item is actually created. In some embodiments, the information received from content management system in the synchronization (351) (353) that is used to update (320) the client content item can be information that the cloud content item was created, can be an updated reference to the actual location in the cloud where the cloud content item exists, and/or can be an updated identifier for the cloud content item.

Figure 4A:
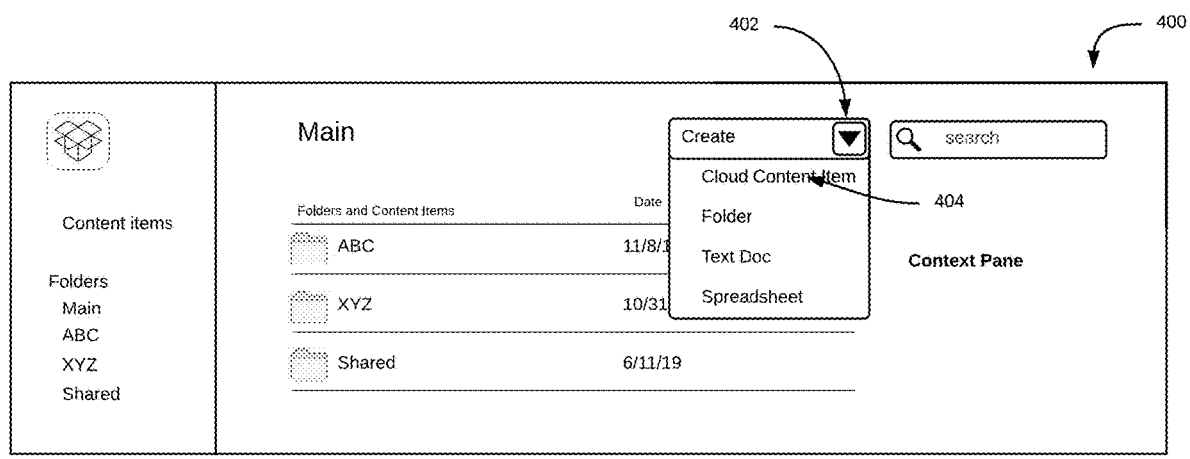
FIG. 4A, FIG. 4B, and FIG. 4C show an example user interface of client application at three different times in accordance with some aspects of the present technology.
Figure 4B:
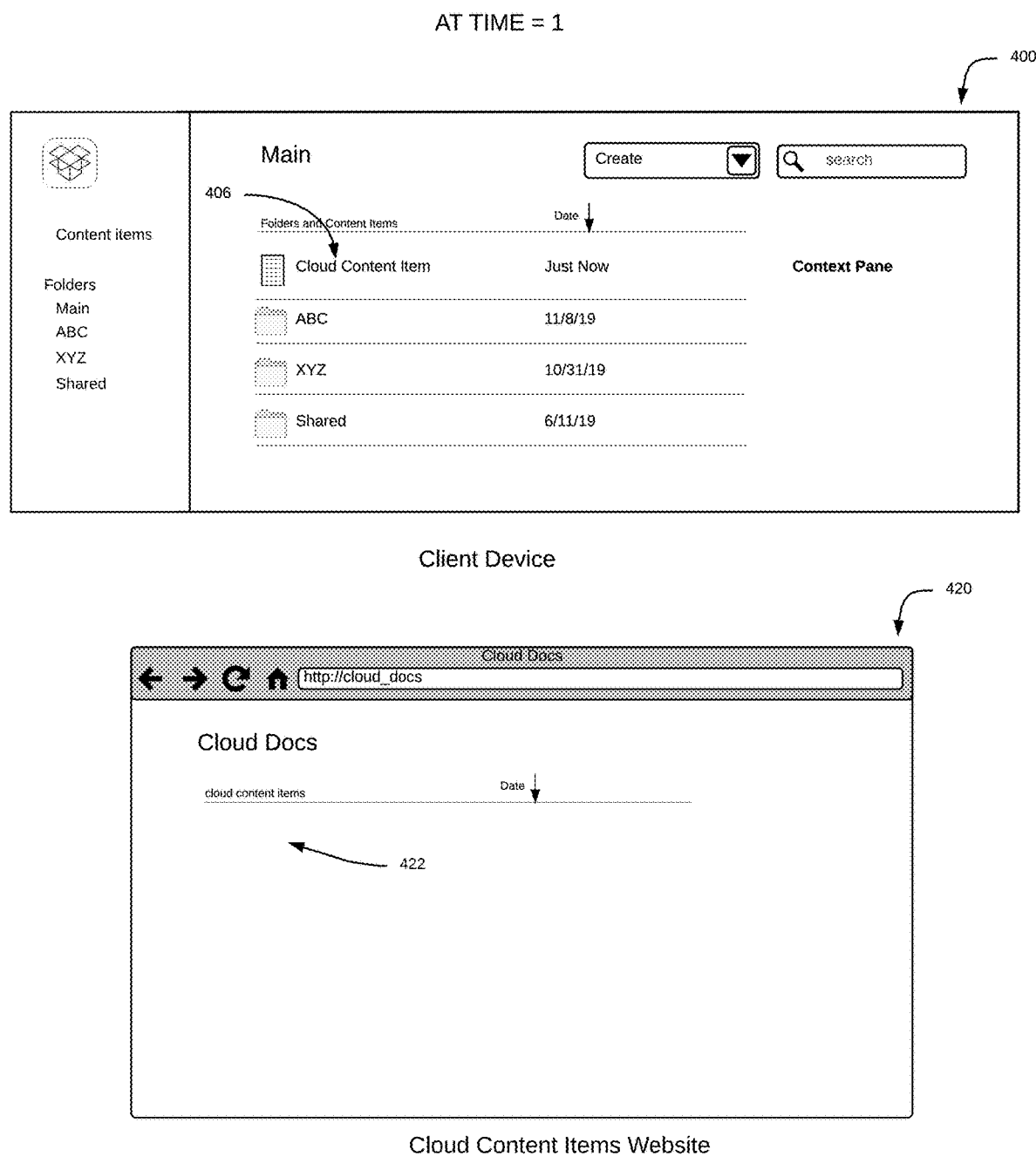
Figure 4C:
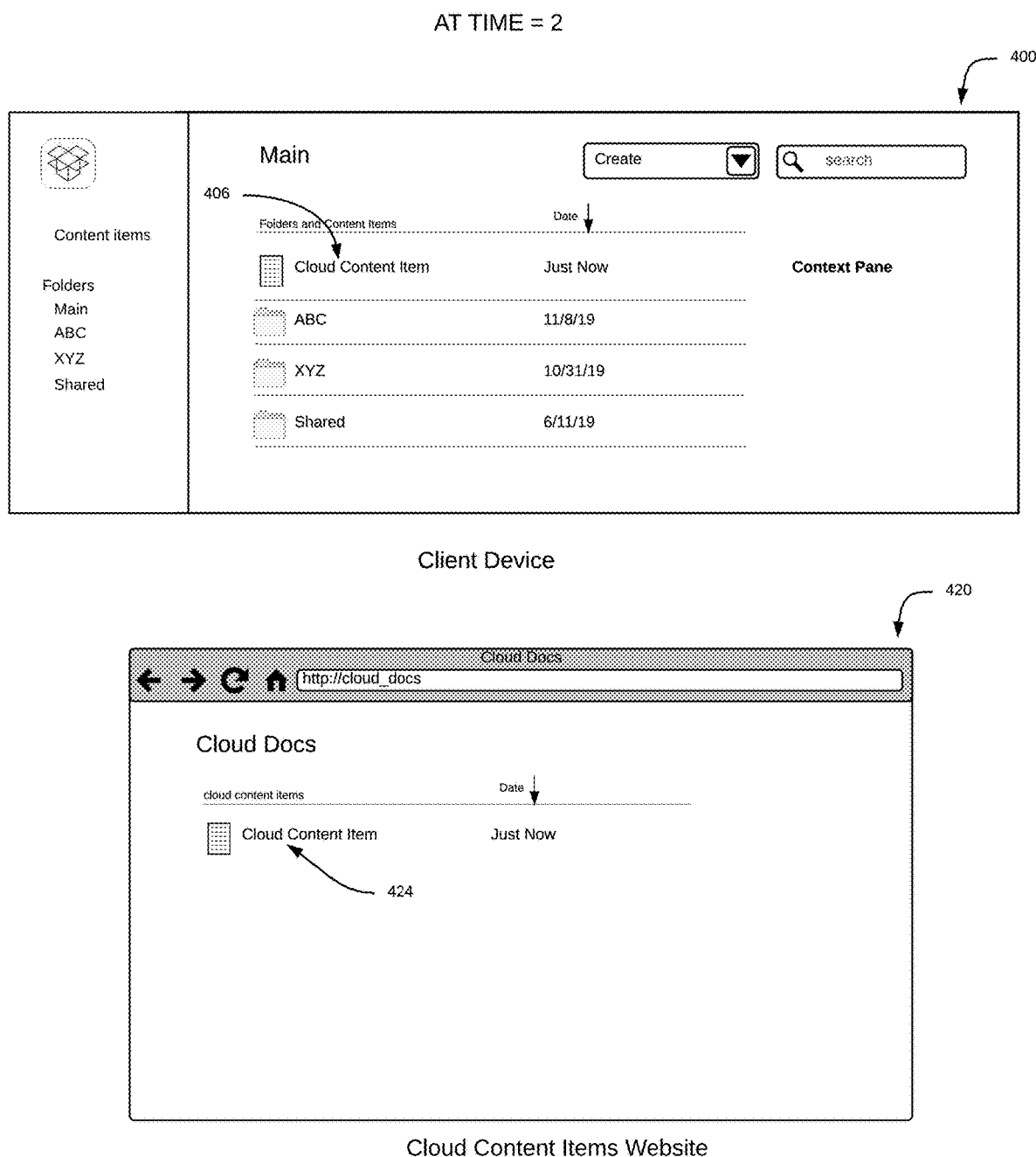

FIG. 4A, FIG. 4B, and FIG. 4C illustrate example user interfaces presented by client device 150 in accordance with some aspects of the present technology described herein. In some embodiments, user interface 400 can represent a file browsing interface such as APPLE's FINDER or MICROSOFT's EXPLORER, or can be an application with file browsing capability such as client application 152.

FIG. 4A shows an example user interface 400 of client application 152 at a time=0. At this time the user interacts with the content item create menu 402 of user interface 400 to select option 404 to create a cloud content item, which in turn initiates the methods illustrated in FIG. 3A and FIG. 3B.

FIG. 4B shows an example of user interface 400 at time=1 which can occur immediately after time=0. Time=1 corresponds to step 304 and FIG. 3A and FIG. 3B. At this time client content item 406 appears as a representation of the cloud content item in the file system of client device 150. At the same time, user interface 420 illustrates the webpage of cloud content item provider 215 (or collaborative document service 134) showing a listing 422 of available cloud content items and none exist because the cloud content item represented by client content item 406 has not yet been created by content management system 110.

FIG. 4C shows an example of user interface 400 and user interface 420 at time=2 which can occur some time after time=1. Time=2 can correspond to any time after step 313 in FIG. 3A and FIG. 3B has occurred. In FIG. 4C user interface 420 shows the webpage of cloud content item provider 215 (or collaborative document service 134) cloud content item 424 corresponding to client content item 406 has finally been created.

Figure 5:
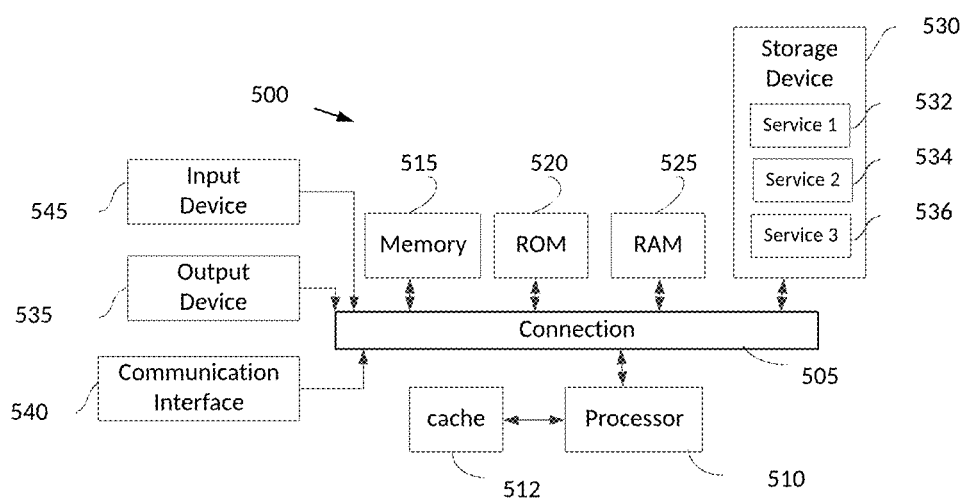
FIG. 5 shows an example of a system for implementing certain aspects of the present technology.

FIG. 5 shows an example of computing system 500, which can be for example any computing device making up client device 150, content management system 110 or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit 510 and connection 505 that couples various system components including system memory 515, such as read only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
receiving, by a client application operating on a client device, a request to create a cloud content item at a content management system;
creating, by the client application, a client content item as a representation of a not yet created cloud content item, the client content item being created in a local file system of the client device;
generating, by the client application, a content item ID for the cloud content item that is unique to the content management system;
after the creating the client content item and generating the content item ID for the cloud content item, sending, to the content management system, an instruction to create the cloud content item with the content item ID for the cloud content item;
receiving a synchronization communication from the content management system to synchronize information regarding the created cloud content item with the client content item; and
updating the client content item representing the cloud content item after the cloud content item has been created by the content management system.

2. The method of claim 1, wherein the client content item representing the cloud content item not yet created at the content management system includes metadata attributes, the metadata attributes including a designation that the client content item is the representation of the cloud content item, and the content item ID for the cloud content item.

3. The method of claim 1, wherein the content item ID comprises at least a namespace ID and a string of arbitrary characters.

4. The method of claim 1, wherein the client content item representing the cloud content item includes metadata attributes, the metadata attributes including a title for the cloud content item, wherein the title is included in the instruction to create the cloud content item and is used to name the cloud content item upon its creation.

5. The method of claim 1, wherein the sending the instruction to the content management system to create the cloud content item comprises:

sending an instruction to place the client content item representing the cloud content item into a synchronization queue of content items to be synchronized with respective copies of the content items stored at the content management system.

6. The method of claim 1 comprising:
receiving a selection of the client content item representing the cloud content item prior to the receiving the synchronization communication from the content management system;
connecting to a first URL hosted by the content management system, wherein the content management system prioritizes the creation of the cloud content item; and
receiving a redirection to a second URL for the created cloud content item.

7. A non-transitory computer readable medium comprising instructions that are effective to cause at least one processor of a content management system to:
receive, from a client application operating on a client device, an instruction to create, at the content management system, a cloud content item having a content item ID generated at the client device, wherein the content item ID corresponds to a client content item created by and stored on the client device, the client content item being a representation of the cloud content item not yet created at the content management system;
create, in response to the instruction, the cloud content item having the content item ID; and
sending synchronization information to the client device for synchronizing the cloud content item with the client content item.

8. The non-transitory computer readable medium of claim 7, wherein the instruction to create the cloud content item comprises a synchronization request to synchronize the client content item representing the cloud content item with the content management system.

9. The non-transitory computer readable medium of claim 8, further comprising instructions effective to cause the at least one processor of the content management system to:
after receiving of the instruction to synchronize the client content item representing the cloud content item, determine that the cloud content item does not yet exist.

10. The non-transitory computer readable medium of claim 7, wherein the instruction to create the cloud content item is a request from the client device to open the cloud content item, wherein the non-transitory computer readable medium further includes instructions effective to cause the at least one processor of the content management system to:
determine that the cloud content item that is represented by the client content item does not yet exist.

11. The non-transitory computer readable medium of claim 7, wherein the client content item representing the cloud content item not yet created at the content management system includes metadata attributes, the metadata attributes including a designation that the client content item represents the cloud content item, and the content item ID for the cloud content item.

12. The non-transitory computer readable medium of claim 7, wherein the content item ID is at least made up of a namespace ID and a string of arbitrary characters.

13. The non-transitory computer readable medium of claim 7, wherein the client content item includes metadata attributes, the metadata attributes including a title for the cloud content item, wherein the title is included in the instruction to create the cloud content item and is used to name the cloud content item upon its creation.

14. A system comprising:
a client device configured to:
receive, by a client application operating on the client device, a request to create a cloud content item at a content management system;
create, by the client application a client content item as a representation of the not yet created cloud content item, the client content item being created in a local file system of the client device;
generate, by the client device, a content item ID for the cloud content item that is unique to the content management system; and
after the creating the client content item and generating the content item ID for the cloud content item, send, to the content management system, an instruction to create the cloud content item with the content item ID for the cloud content item.

15. The system of claim 14 further comprising:
the content management system configured to:
receive a synchronization request from the client device, the synchronization request including the client content item, wherein the client content item includes the content item ID;
determine that the cloud content item that the client content item represents does not yet exist when the content item ID is not recognized; and
create, the cloud content item having the content item ID.

16. The system of claim 14, wherein the client device is further configured to:
receive a synchronization communication from the content management system to synchronize information regarding a created cloud content item with the client content item; and
update the client content item representing the cloud content item after the cloud content item has been created by the content management system.

17. The system of claim 14, wherein the client content item representing the cloud content item includes metadata attributes, the metadata attributes including a designation that the client content item is the representation of the cloud content item, and the content item ID for the cloud content item.

18. The system of claim 14, wherein prior to the creation of the cloud content item, receive a user input to move the client content item to a new directory or to change a title to the client content item.

19. The system of claim 14, wherein the client device is further configured to:
receive a selection of the client content item representing the cloud content item prior to the receiving a synchronization communication from the content management system;
connect to a first URL hosted by the content management system, wherein the content management system prioritizes the creation of the cloud content item; and
receive a redirection to a second URL for the created cloud content item.

20. The system of claim 19, wherein the content management system is further configured to:
receive a request to access the cloud content item having the content item ID;
determine that the cloud content item that the client content item represents does not yet exist when the content item ID is not recognized; and
create, the cloud content item having the content item ID at the client device.

21. The system of claim 14, wherein the content item ID comprises a generated portion that is confirmed to not conflict with any other content item IDs at the content management system, and wherein the generated portion is prepended or appended by a namespace portion.

22. The system of claim 21, wherein the namespace portion is a host ID of the client device corresponding to a specific content management system user ID signed into a specific installation of the client application on the client device.

23. The method of claim 1, wherein the content item ID is generated based on a namespace associated with the cloud content item and a unique value associated with the client application.

\* \* \* \* \*